United States Patent
Hossain et al.

(10) Patent No.: US 7,042,189 B2
(45) Date of Patent: May 9, 2006

(54) CONTROLLING AN ELECTRIC MOTOR

(75) Inventors: Syed A. Hossain, Akron, OH (US);
Iqbal Husain, Copley, OH (US);
Bruno P. B. Lequesne, Troy, MI (US);
Avoki M. Omekanda, Rochester, MI (US); Harald Klode, Centerville, OH (US)

(73) Assignees: Delphi Technologies, Inc., Troy, MI (US); The University of Akron, Troy, MI (US)

( * ) Notice: Subject to any disclaimer, the term of this patent is extended or adjusted under 35 U.S.C. 154(b) by 29 days.

(21) Appl. No.: 10/136,043

(22) Filed: Apr. 30, 2002

(65) Prior Publication Data

US 2003/0201749 A1  Oct. 30, 2003

(51) Int. Cl.
*H02P 5/28*  (2006.01)

(52) U.S. Cl. .................. 318/701; 318/432; 318/434; 318/254; 701/70

(58) Field of Classification Search .............. 318/701, 318/432, 434, 254, 696; 701/70
See application file for complete search history.

(56) References Cited

U.S. PATENT DOCUMENTS

| | | | |
|---|---|---|---|
| 4,404,511 A | | 9/1983 | Nola ...................... 318/729 |
| 4,707,650 A | * | 11/1987 | Bose ...................... 318/685 |
| 4,739,240 A | | 4/1988 | MacMinn et al. ........ 318/696 |

(Continued)

FOREIGN PATENT DOCUMENTS

| | | |
|---|---|---|
| EP | 0739085 | 10/1996 |
| EP | A-0739085 | * 10/1996 |
| WO | WO/01/59922 | 8/2001 |

OTHER PUBLICATIONS

NëRNBERG GERMANY 1993, Jun. 11–24, 1993, conference & lxhibition, SEMINAR 5'.*

T.J.E. Miller, "*Switched reluctance motors and their control*", Magnaphysics Publishing and Oxford Science Publications, especially pp. 99–113 (1993).

P.C. Kjaer, et al., "*High–grade control of switched reluctance machines*", Proceedings of the 1996 IEEE Conference on Industry Applications (Oct. 1996).

M.S. Islam, et al., "*A sensorless wide–speed range SRM drive with optimally designed critical rotor angles*", Proceedings of the 2000 IEEE Conference on Industry Applications (Oct. 2000).

R. Wallace et al., "*A balanced commutator for switched reluctance motors to reduce torque ripple*", IEEE Trans. of Power Electronics, vol. 7, No. 4, pp. 617–626 (Oct. 1992).

(Continued)

*Primary Examiner*—Rita Leykin
(74) *Attorney, Agent, or Firm*—Michael D. Smith

(57) ABSTRACT

In one method for controlling an electric motor, current turn-on and turn-off rotor-position angles for each motor phase are chosen to substantially maximize the absolute value of average motor torque when the motor is operating in two different quadrants of motor torque and motor speed. The first quadrant has positive motor torque and positive motor speed. The second quadrant has negative torque and positive speed. The third quadrant has negative torque and negative speed. The fourth quadrant has positive torque and negative speed. In another method, the motor is operated in at least one of the first and third quadrants and in at least one of the second and fourth quadrants, wherein the absolute value of motor speed is limited when the motor is operating in the first or third quadrants but not in the second or fourth quadrants. In one example, the motor operates a vehicle brake caliper.

25 Claims, 4 Drawing Sheets

U.S. PATENT DOCUMENTS

| | | | | |
|---|---|---|---|---|
| 4,933,620 | A | * 6/1990 | MacMinn et al. | 318/696 |
| 5,012,172 | A | 4/1991 | Sember | 318/696 |
| 5,440,218 | A | 8/1995 | Oldenkamp | 318/701 |
| 5,493,195 | A | 2/1996 | Heglund et al. | 318/701 |
| 5,592,062 | A | 1/1997 | Bach | 318/805 |
| 5,864,218 | A | 1/1999 | Orthmann | 318/701 |
| 5,977,740 | A | 11/1999 | McCann | 318/701 |
| 6,011,377 | A | 1/2000 | Heglund et al. | 318/701 |
| 6,046,561 | A | 4/2000 | Zup et al. | 318/439 |
| 6,137,257 | A | 10/2000 | Heber et al. | 318/701 |
| 6,253,141 | B1 | * 6/2001 | McCann | 701/71 |
| 6,407,528 | B1 | 6/2002 | Disser et al. | 318/701 |
| 6,411,061 | B1 | 6/2002 | Disser et al. | 318/701 |
| 6,593,720 | B1 | 7/2003 | Omekanda | 318/701 |

OTHER PUBLICATIONS

A. Radun, "*Generating with the switched reluctance motor*", Proceedings of the 1994 Applied Power Electronics Conference, Copyright IEEE (1994).

A.O. Omekanda, "*Method of optimizing performance parameters of a switched reluctance motor*", U.S. patent application Ser. No. 09/757,040, dated Mar., 2000 (based on GM/Delphi ROI #H–202,986.

A.V. Radun, "*Design considerations for the switched reluctance motor*", IEEE Trans. on Industry Applications, vol. 31, No. 5, pp. 1079–1087 (Sept./Oct. 1995).

I. Husain, et al., "*Unbalanced force calculation in switched reluctance machines,*" IEEE Trans. on Magnetics, vol. 36, No. 1, pp. 330–338 (Jan. 2000).

Dr. Stephenson, Dr. Blake, The Characteristics, Design and Applications of Switched Reluctance Motors and Drives.

D.E. Cameron, J.H. Lang, The Control of High–Speed Variable Reluctance Generators in Electric Power Systems, IEEE Transactions on Industry Applications, vol. 29, No. 6, Nov./Dec. 1993, pp. 1106–1109.

Philip Carne Kjaer, Peter Nielsen, Lars Anderson, Frede Blaabjerg; A New Energy Optimizing Control Strategy for Switched Reluctance Motors; IEEE Transactions on Industry Applications, vol. 31, No. 5, Sep./Oct. 1995; pp. 1088–1095.

Middle East Technical University; ICEM 98 Proceedings, vol. III, International Conference on Electrical Machines, Sep. 2–4, 1998, Istanbul, Turkey; Simulation of an Excitation Scheme to Reduce Torque Ripple of Switched Reluctance Motor Based on 2D–FEM Field Calculation; pp. 2128–2130.

T.J.E. Miller; Electronic Control of Switched Reluctance Machines; pp. 92–97.

European Electric Road Vehicle Association; A Future for City; The $15^{th}$ International Electric Vehicle Symposium and Exhibition; A Switched–Reluctance Drive for Electric Vehicles with Optimized Efficiency in each Working Point; pp. 1000–1008.

* cited by examiner

CONTROLLING AN ELECTRIC MOTOR

TECHNICAL FIELD

The present invention relates generally to motors, and more particularly to controlling an electric motor.

BACKGROUND OF THE INVENTION

One type of electric motor is a brushless motor such as, but not limited to, a switched-reluctance motor. One example of a conventional switched-reluctance motor has 8 stator poles and 6 rotor poles. This motor example has 4 motor phases (i.e., the number of stator poles divided by two) which are the four opposite pairs of stator poles. This motor example has a machine step of 60 degrees (i.e., 360 degrees divided by the number of rotor poles) which is the rotor period, in degrees, between a rotor pole being aligned with a first stator pole (assume the rotor-position angle is minus 60 degrees) and that rotor pole rotating and being aligned with an adjacent second stator pole (where the rotor-position angle is 0 degrees). The unaligned rotor-position angle is midway between the two aligned rotor-position angles and therefore is minus 30 degrees. The inductance is at a peak (which may be a flat peak) at a rotor-position angle of minus 60 degrees, then falls to a valley (which may be a flat valley) at a rotor-position angle of minus 30 degrees and then rises to the peak at a rotor-position angle of 0 degrees.

One conventional application of a switched-reluctance motor is to operate the motor only in the first quadrant of positive motor torque and positive motor speed (i.e., in a forward motoring mode) where the first quadrant is a quadrant of the motor torque versus motor speed diagram. Another conventional application is to operate the motor only in the second quadrant of negative torque and positive motor speed (i.e., in a regenerative braking or a generator mode). A conventional method for controlling a switched-reluctance motor is to choose current turn-on and turn-off rotor-position angles to maximize machine efficiency. In one conventional implementation, when the motor is operating in the first quadrant, the current turn-on rotor-position angle is chosen at the beginning of the rising inductance region (e.g., at a rotor-position angle of minus 29 degrees in the previous motor example). A further conventional application is to operate the motor in all four quadrants wherein the motor is controlled for constant power in the second and fourth quadrants.

What is needed is improved control of an electric motor useful, for example and without limitation, in a system including a brake caliper operatively connected to the motor.

SUMMARY OF THE INVENTION

A first method of the invention is for controlling an electric motor and includes steps a) through c). Step a) includes choosing current turn-on and turn-off rotor-position angles for each motor phase to substantially maximize the absolute value of average motor torque when the motor is operating at a motor speed in one of four quadrants. The first quadrant has positive motor torque and positive motor speed. The second quadrant has negative motor torque and positive motor speed. The third quadrant has negative motor torque and negative motor speed. The fourth quadrant has positive motor torque and negative motor speed. Step b) includes choosing current turn-on and turn-off rotor-position angles for each motor phase to substantially maximize the absolute value of average motor torque when the motor is operating at a motor speed in an other quadrant different from the one quadrant of step a). Step c) includes operating the motor in each of the one quadrant of step a) and the other quadrant of step b).

A second method of the invention is for controlling an electric motor and includes steps a) through e). Step a) includes choosing current turn-on and turn-off rotor-position angles for each motor phase to substantially maximize the absolute value of average motor torque when the motor is operating at a motor speed in a first quadrant of positive motor torque and positive motor speed. Step b) includes choosing current turn-on and turn-off rotor-position angles for each motor phase to substantially maximize the absolute value of average motor torque when the motor is operating in a second quadrant of negative motor torque and positive motor speed. Step c) includes choosing current turn-on and turn-off rotor-position angles for each motor phase to substantially maximize the absolute value of average motor torque when the motor is operating in a third quadrant of negative motor torque and negative motor speed. Step d) includes choosing current turn-on and turn-off rotor-position angles for each motor phase to substantially maximize the absolute value of average motor torque when the motor is operating in a fourth quadrant of positive motor torque and negative motor speed. Step e) includes operating the motor in each of the first, second, third, and fourth quadrants.

A third method of the invention is for controlling an electric motor and includes steps a) through c). Step a) includes operating the motor in at least one of a first quadrant having positive motor torque and positive motor speed and a third quadrant having negative motor torque and negative motor speed. Step b) includes operating the motor in at least one of a second quadrant having negative motor torque and positive motor speed and a fourth quadrant having positive motor torque and negative motor speed. Step c) includes limiting the absolute value of motor speed when the motor is operating in the first or third quadrant but not when the motor is operating in the second or fourth quadrant.

A fourth method of the invention is for controlling an electric motor operatively connected to a vehicle brake caliper and includes steps a) through f). Steps a) through e) are identical to steps a) through e) of the previously-described second method of the invention. Step f) includes limiting the absolute value of motor speed when the motor is operating in the first or third quadrant but not when the motor is operating in the second or fourth quadrant.

Several benefits and advantages are derived from one or more of the methods of the invention. Choosing current turn-on and turn-off rotor-position angles to maximize the absolute value of average motor torque for an electric motor which operates in two, three or four of the quadrants allows better system performance when the motor is used in applications calling for fast motion in both directions as well as the ability to reverse motor direction quickly. One example, without limitation, of such motor application is having the motor operatively connected to a vehicle brake caliper for vehicle braking. Limiting the absolute value of motor speed when the motor is operating in the first or third quadrants but not in the second or fourth quadrants provides for faster rotor motion reversals, as can be appreciated by those skilled in the art.

DESCRIPTION OF THE PREFERRED EMBODIMENTS

Figure 1:
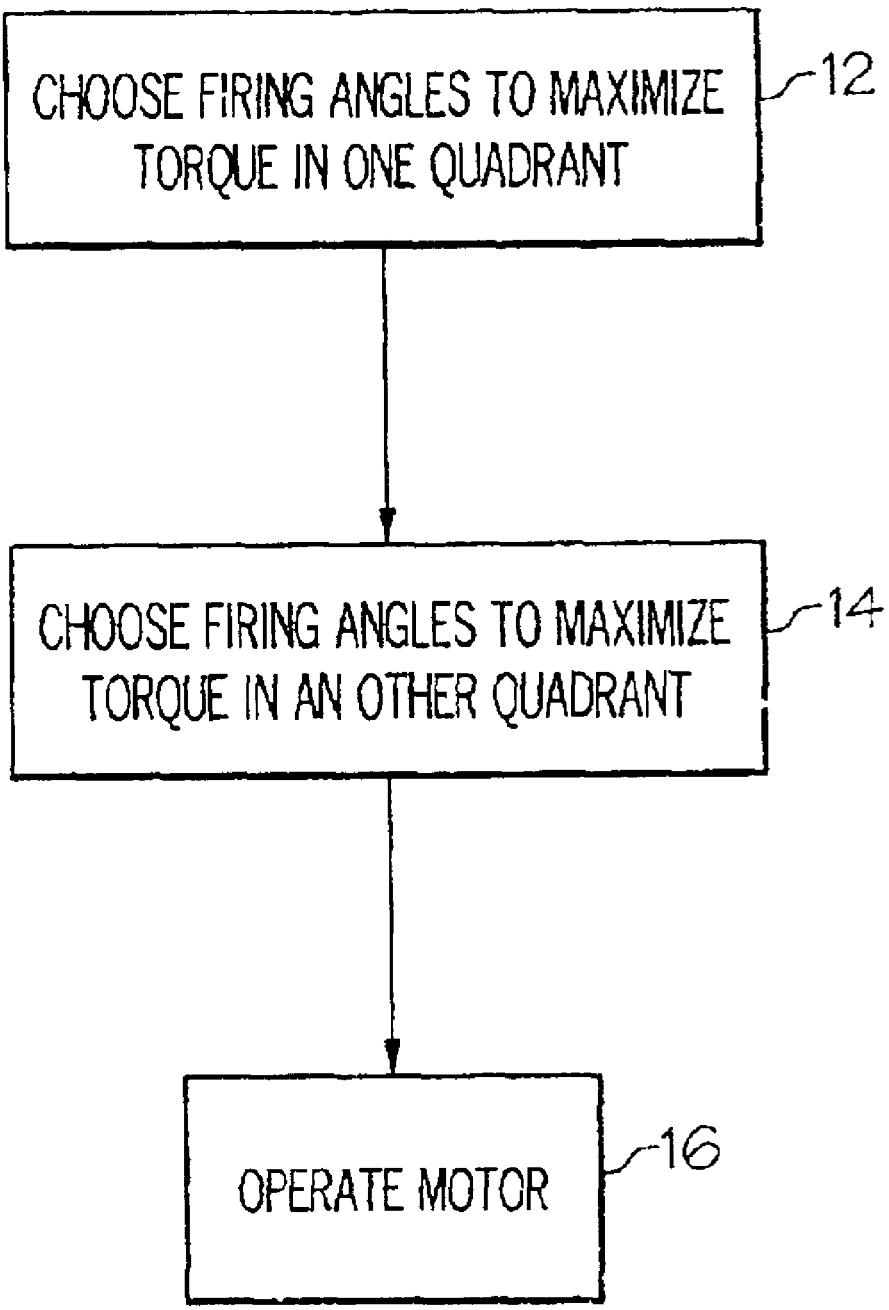
FIG. 1 is a block diagram of a first method of the invention for controlling an electric motor.

Referring now to the drawings, FIG. 1 shows a first method of the invention. The first method is for controlling an electric motor and includes steps a) through c). Step a) is labeled as "Choose Firing Angles To Maximize Torque In One Quadrant" in block 12 of FIG. 1. Step a) includes choosing current turn-on and turn-off rotor-position angles for each motor phase to substantially maximize the absolute value of average motor torque when the motor is operating at a motor speed in one of four quadrants. The first quadrant has positive motor torque and positive motor speed. The second quadrant has negative motor torque and positive motor speed. The third quadrant has negative motor torque and negative motor speed. The fourth quadrant has positive motor torque and negative motor speed. Step b) is labeled as "Choose Firing Angles To Maximize Torque In An Other Quadrant" in block 14 of FIG. 1. Step b) includes choosing current turn-on and turn-off rotor-position angles for each motor phase to substantially maximize the absolute value of average motor torque when the motor is operating at a motor speed in an other quadrant different from the one quadrant of step a). Step c) is labeled as "Operate Motor" in block 16 of FIG. 1. Step c) includes operating the motor in each of the one quadrant of step a) and the other quadrant of step b). It is understood that the motor operates in only one quadrant at a time. It is noted that choosing angles to substantially maximize torque includes, without limitation, choosing angles for the purpose of maximizing torque and choosing angles, for whatever purpose, which substantially maximizes torque.

Choosing current turn-on and turn-off rotor-position angles for each motor phase which substantially maximizes the absolute value of average motor torque when the motor is operating at a motor speed in one of the four quadrants is within the routine capabilities of those skilled in the art. It is noted that choosing current turn-on and turn-off rotor-position angles to maximize the absolute value of average motor torque for an electric motor which operates in two, three or four of the quadrants allows better system performance when the motor is used in applications calling for fast motion in both directions as well as the ability to reverse motor direction quickly. One example, without limitation, of such motor application is having the motor operatively connected to a vehicle brake caliper for vehicle braking. Other examples are left to the artisan.

In one application of the first method, the motor is a brushless motor. In one variation, the brushless motor is a switched-reluctance motor.

One example of the first method also includes the step of limiting the absolute value of motor speed if the motor is operating in the first or third quadrant but not if the motor is operating in the second or fourth quadrant. This means limiting the absolute value of motor speed if the motor is operating in the first quadrant, limiting the absolute value of motor speed if the motor is operating in the third quadrant, not limiting the absolute value of motor speed if the motor is operating in the second quadrant, and not limiting the absolute value of motor speed if the motor is operating in the fourth quadrant. This will provide for faster rotor motion reversals, which is important in some motor applications, such as having the motor operatively connected to a vehicle brake caliper for vehicle braking, as can be appreciated by those skilled in the art. Other applications and the choice of techniques to limit motor speed are left to the artisan. In one variation, the absolute value is substantially identical in the first and third quadrants.

The same or a different example of the first method also includes the steps of using the motor in a system and setting the motor current to the highest level allowed by the system. This will increase the absolute value of average motor torque.

In the same or a different example, the one quadrant is the first quadrant, and step a) chooses a current turn-on rotor-position angle for each motor phase in a range from a rotor-position angle corresponding to a falling actual inductance equal to one-half peak (i.e., one-half maximum) actual inductance to a rotor-position angle corresponding to minimum actual inductance (i.e., just before the rising of the actual inductance). In one variation, step a) chooses a current turn-on rotor-position angle for each motor phase such that the current first reaches a maximum when the rotor-position angle corresponds to minimum actual inductance, as can be seen in FIG. 2.

Figure 2:
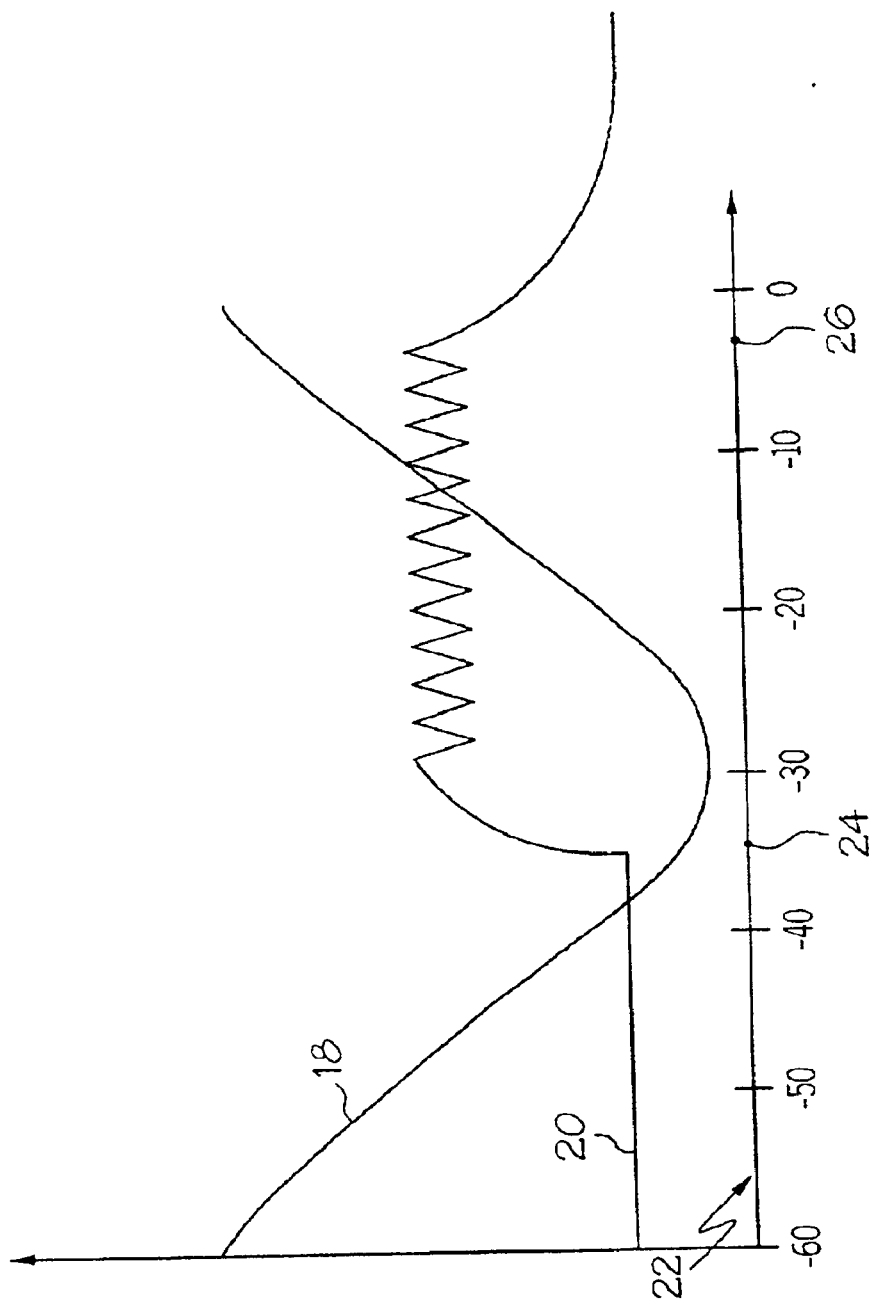
FIG. 2 is a graph of actual inductance and of motor current versus rotor-position angle for a motor phase of a first motor embodiment used in the first method of FIG. 1 when the motor is operating in the first quadrant.

FIG. 2 is a graph of the actual inductance 18 of the motor phases where the current is being activated, and of the current (also called motor phase current or just motor current) 20 versus rotor-position angle (shown as a horizontal line 22 marked every 10 degrees) for a first motor embodiment having a machine step of 60 degrees and operating in the first quadrant. The rotor rotates in a direction from minus 60 degrees to 0 degrees. A falling actual inductance 18 is an actual inductance corresponding to rotor position angles 22 in FIG. 2 which are to the left of minus 30 degrees. Values for the actual inductance 18 and for the current 20 have been omitted from the graph for clarity. However, it is understood that the minimum value of the current 20 seen in the graph is 0 amps and that the minimum value of the actual inductance 18 is never 0 mH (milli-Henrys) and typically (but not necessarily) is 10% of the maximum value.

In one variation and referring to FIG. 2, the current turn-on rotor-position angle 24 is substantially minus 35 degrees which is substantially 5 degrees before the unaligned rotor-position angle of minus 30 degrees which corresponds to minimum actual inductance (such minimum actual inductance being defined to be just before the rising of the actual inductance 18) and which corresponds to when the current 20 first reaches a maximum. It is noted that the current 20 reaches its peak before the rise in the actual inductance 18. It is further noted that thereafter, in this variation, the current 20 is optionally pulsed as shown in what is known as hysteresis current control, whereby the current is controlled to be within a given band around a target value. In other variations, hysteresis control is not used as is known to those skilled in the art. Whether or not hysteresis current control is used, step a) chooses a current turn-on rotor-position angle 24 for each motor phase further from the rising of the actual inductance 18 for a higher motor speed than for a lower motor speed, as can be appreciated by the artisan.

In one implementation using a 60-degree machine step motor, as seen in FIG. 2, the current turn-on rotor-position angle 24 is chosen in the range of minus 34 degrees (at low motor speeds) and minus 38 degrees (at the highest motor speed). The particular angle and range of angles chosen for the current turn-on rotor-position angle 24 depends on the particular motor, as can be appreciated by the artisan.

In one variation and referring to FIG. 2, the current turn-off rotor-position angle 26 is substantially minus 4 degrees which is substantially 4 degrees before the aligned rotor-position angle of 0 degrees which corresponds to the peak of the actual inductance 18. Step a) chooses a current turn-off rotor-position angle 26 for each motor phase further from the peak of the actual inductance 18 for a higher motor speed than for a lower motor speed. In one implementation, the current turn-off rotor-position angle 26 is chosen in the range of minus 4 degrees (at low motor speeds) and minus 9 degrees (at the highest motor speed). The particular angle and range of angles chosen for the current turn-off rotor-position angle 26 depends on the particular motor, and can even include angles past the peak actual inductance, as can be appreciated by the artisan.

In the same or a different example, the other quadrant is the second quadrant. In this example, step b) chooses a current turn-on rotor-position angle equal to the current turn-off rotor-position angle chosen in step a) minus from zero to substantially eight percent of the machine step. In one modification, step b) chooses a current turn-off rotor-position angle equal to the current turn-on rotor-position angle chosen in step a) plus the machine step plus from zero to substantially three percent of the machine step.

Figure 3:
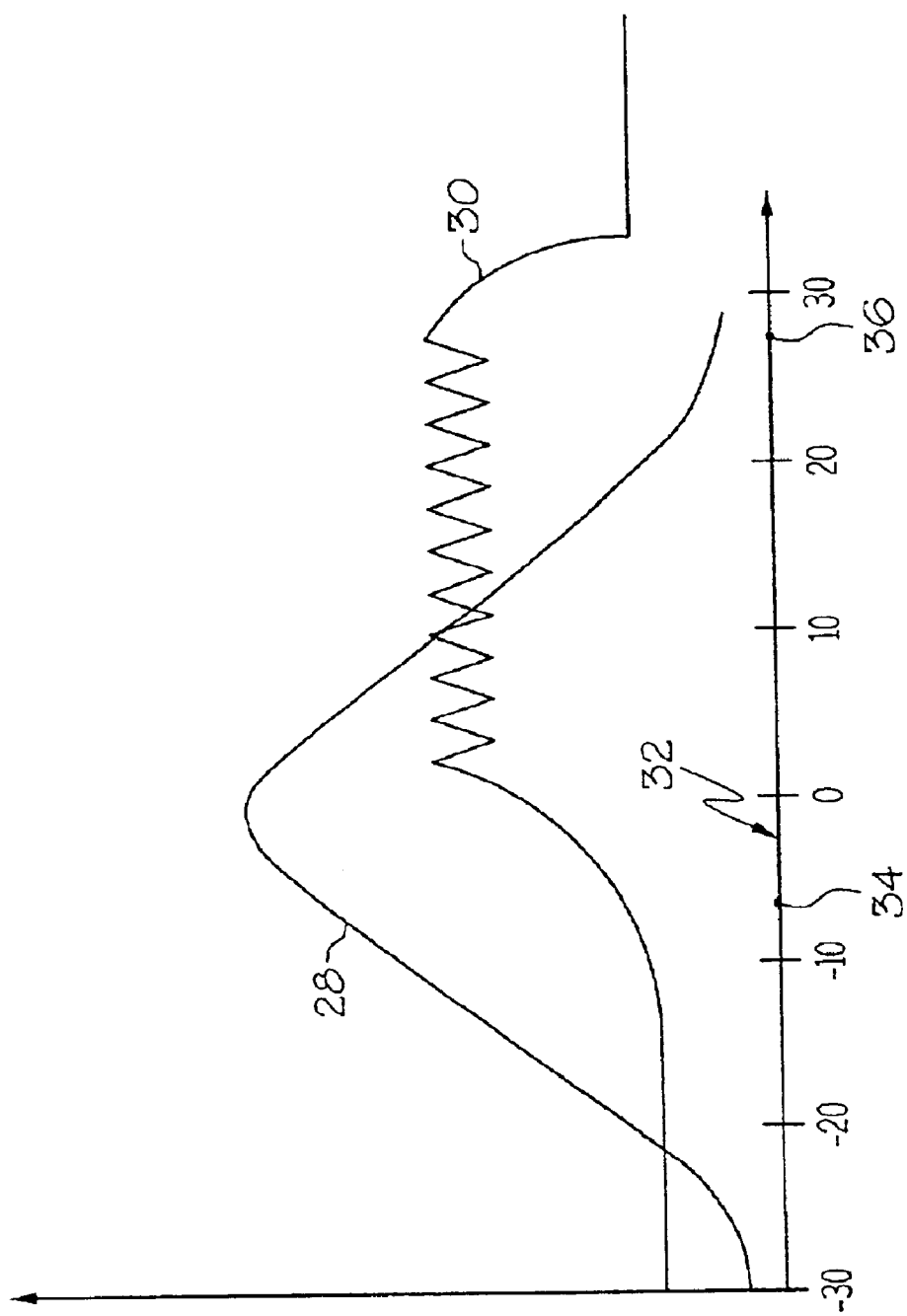
FIG. 3 is a graph of actual inductance and of motor current versus rotor-position angle for a motor phase of the first motor embodiment used in the first method of FIG. 1 when the motor is operating in the second quadrant.

FIG. 3 is a graph of the actual inductance 28 of the motor phases where the current is being activated, and of the current (also called motor phase current or just motor current) 30 versus rotor-position angle (shown as a horizontal line 32 marked every 10 degrees) for the first motor embodiment of FIG. 2 but with the motor operating in the second quadrant. The rotor rotates in a direction from minus 30 degrees to plus 30 degrees. Values for the actual inductance 28 and for the current 30 have been omitted from the graph for clarity. However, it is understood that the minimum value of the current 30 seen in the graph is 0 amps and that the minimum value of the actual inductance 28 is never 0 mH (milli-Henrys) and typically (but not necessarily) is 10% of the maximum value.

In one variation and referring to FIG. 3, the current turn-on rotor-position angle 34 is substantially minus 8 degrees which is substantially 8 degrees before the aligned rotor-position angle of 0 degrees which corresponds to the peak of the actual inductance 28. It is noted that the current 30 reaches its peak at or soon after the maximum value of the actual inductance 28. It is further noted that thereafter, in this variation, the current 30 is pulsed as shown. Step b) chooses a current turn-on rotor-position angle 34 for each motor phase further from the peak of the actual inductance 28 for a higher motor speed than for a lower motor speed, as can be appreciated by the artisan. In one implementation of the first motor embodiment of FIG. 2, the current turn-on rotor-position angle 34 in FIG. 3 is chosen in the range of minus 7 degrees (at low motor speeds) and minus 11 degrees (at the highest motor speed). The particular angle and range of angles chosen for the current turn-on rotor-position angle 34 depends on the particular motor, as can be appreciated by the artisan.

In the same or different variation and referring to FIG. 3, the current turn-off rotor-position angle 36 is substantially 27 degrees which is substantially 3 degrees before the unaligned rotor-position angle of 30 degrees which corresponds to the minimum (or valley) of the actual inductance 28. Step b) chooses a current turn-off rotor-position angle 36 for each motor phase further from the minimum of the actual inductance 28 for a higher motor speed than for a lower motor speed. In one implementation, the current turn-off rotor-position angle 36 is chosen in the range of 26 degrees (at low motor speeds) and 22 degrees (at the highest motor speed). The particular angle and range of angles chosen for the current turn-off rotor-position angle 36 depends on the particular motor, as can be appreciated by the artisan.

In the same or a different example, the turn-on and turn-off rotor-position angles chosen in steps a) through b) are mathematically expressed as quadratic functions of motor speed. In one variation, the coefficients of the quadratic functions are determined through an optimization program. A geometry based nonlinear analytical model is used to simulate the physical motor. The cost function is the work done per stroke which, neglecting the core loss of the motor, is mathematically expressed as a function of phase voltage and phase current. A univariate search technique is used to change one variable at a time so that the cost function is maximized in each of the coordinate directions. The optimization program is subject to the boundary conditions that the derivative of the cost function with respect to the current turn-on rotor-position angle is zero and that the derivative of the cost function with respect to the current turn-off rotor-position angle is zero. Such calculations are within the ordinary level of skill of the artisan.

In the same or a different example, the first method also includes the step of choosing current turn-on and turn-off rotor-position angles for each motor phase to substantially maximize the absolute value of average motor torque when the motor is operating at a motor speed in an additional quadrant different from the one quadrant of step a) and different from the other quadrant of step b), and step c) includes also operating the motor in the additional quadrant.

A second method of the invention is for controlling an electric motor and includes steps a) through e). Step a) includes choosing current turn-on and turn-off rotor-position angles for each motor phase to substantially maximize the absolute value of average motor torque when the motor is operating at a motor speed in a first quadrant of positive motor torque and positive motor speed. Step b) includes choosing current turn-on and turn-off rotor-position angles for each motor phase to substantially maximize the absolute value of average motor torque when the motor is operating in a second quadrant of negative motor torque and positive motor speed. Step c) includes choosing current turn-on and turn-off rotor-position angles for each motor phase to substantially maximize the absolute value of average motor torque when the motor is operating in a third quadrant of negative motor torque and negative motor speed. Step d) includes choosing current turn-on and turn-off rotor-position angles for each motor phase to substantially maximize the absolute value of average motor torque when the motor is operating in a fourth quadrant of positive motor torque and negative motor speed. Step e) includes operating the motor in each of the first, second, third, and fourth quadrants. The previous discussion of optional examples, variations, modifications, etc. of the first method are equally applicable to the second method.

Figure 4:
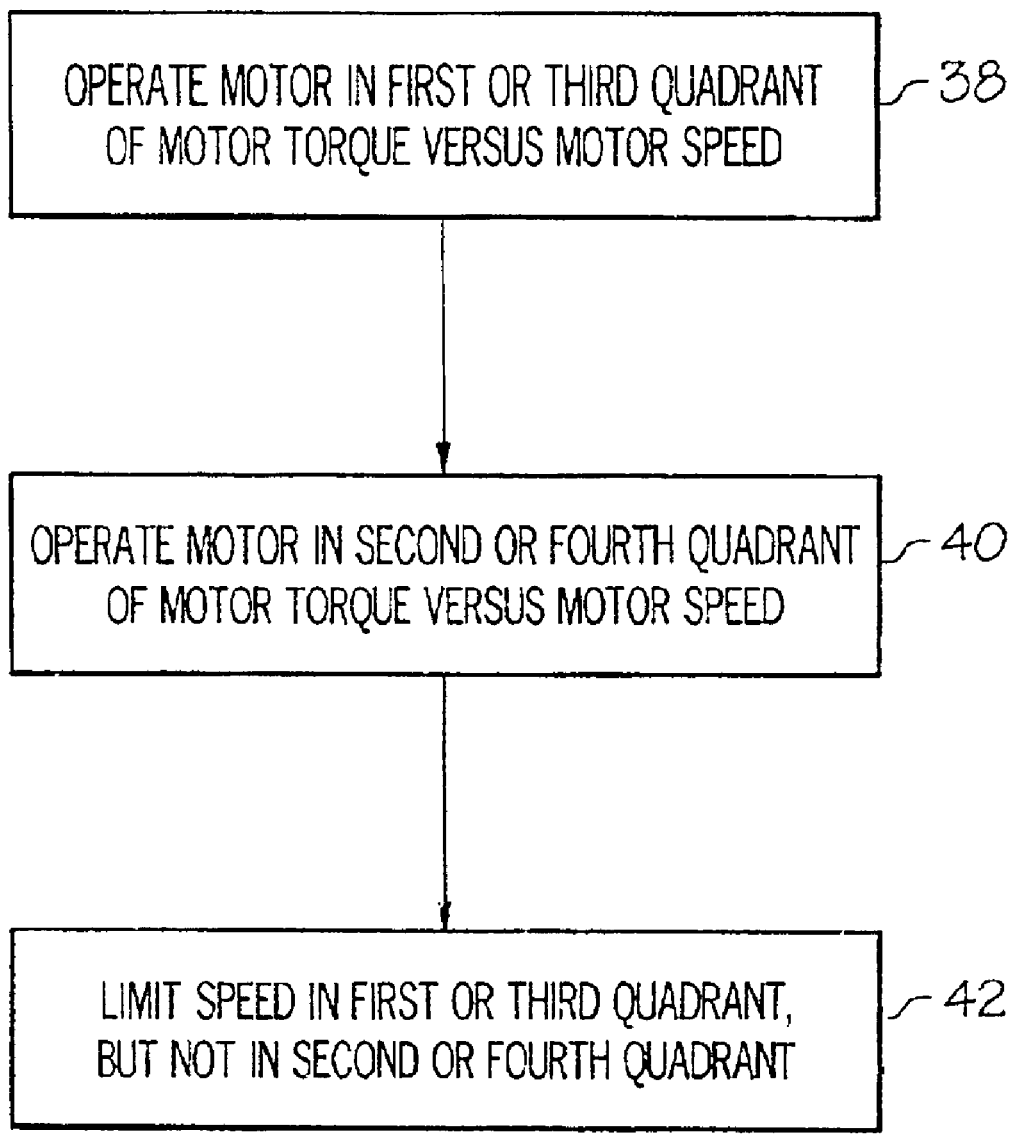
FIG. 4 is a block diagram of another method of the invention.

A third method of the invention is for controlling an electric motor and includes steps a) through c). Step a) is labeled as "Operate Motor In First Or Third Quadrant Of Motor Torque Versus Motor Speed" in block 38 of FIG. 4. Step a) includes operating the motor in at least one of a first quadrant having positive motor torque and positive motor speed and a third quadrant having negative motor torque and negative motor speed. Step b) is labeled as "Operate Motor In Second Or Fourth Quadrant Of Motor Torque Versus Motor Speed" in block 40 of FIG. 4. Step b) includes operating the motor in at least one of a second quadrant having negative motor torque and positive motor speed and a fourth quadrant having positive motor torque and negative motor speed. Step c) is labeled as "Limit Speed In First Or Third Quadrant But Not In Second Or Fourth Quadrant" in block 42 of FIG. 4. Step c) includes limiting the absolute value of motor speed when the motor is operating in the first or third quadrant but not when the motor is operating in the second or fourth quadrant.

In one example of the third method, the absolute value is substantially identical in the first and third quadrants. In the same or a different example of the third method, step a) includes operating the motor in the first quadrant and operating the motor in the third quadrant, and step b) includes operating the motor in the second quadrant and operating the motor in the fourth quadrant. In one variation, the motor is operatively connected to a vehicle brake caliper. It is noted that the first, second, and third methods of the invention are not limited to the motor being operatively connected to a vehicle brake caliper, and other uses for an electric motor that is controlled by the first, second, or third method of the invention are left to the artisan. The previous discussion of optional examples, variations, modifications, etc. of the first method are equally applicable to the third method.

A fourth method of the invention is for controlling an electric motor operatively connected to a vehicle brake caliper and includes steps a) through f). Steps a) through e) are identical to the previously-described steps a) through e) of the second method. Step f) includes limiting the absolute value of motor speed when the motor is operating in the first or third quadrant but not when the motor is operating in the second or fourth quadrant. The previous discussion of optional examples, variations, modifications, etc. of the first method are equally applicable to the fourth method.

Several benefits and advantages are derived from one or more of the methods of the invention. Choosing current turn-on and turnoff rotor-position angles to maximize the absolute value of average motor torque for an electric motor which operates in two, three or four of the quadrants allows better system performance when the motor is used in applications calling for fast motion in both directions as well as the ability to reverse motor direction quickly. One example, without limitation, of such motor application is having the motor operatively connected to a vehicle brake caliper for vehicle braking. Limiting the absolute value of motor speed when the motor is operating in the first or third quadrants but not in the second or fourth quadrants provides for faster rotor motion reversals, as can be appreciated by those skilled in the art. Setting the motor current to the highest level allowed by a system, when the motor is in a system, maximizes the motor torque, as can be appreciated by the artisan.

The foregoing description of several methods of the invention has been presented for purposes of illustration. It is not intended to be exhaustive or to limit the invention to the precise procedure disclosed, and obviously many modifications and variations are possible in light of the above teaching. It is intended that the scope of the invention be defined by the claims appended hereto.

What is claimed is:

1. A method for controlling an electric motor comprising the steps of:
   a) choosing current turn-on and turn-off rotor-position angles for each motor phase to substantially maximize the absolute value of average motor torque when the motor is operating at a motor speed in one of four quadrants, wherein the first quadrant has positive motor torque and positive motor speed, wherein the second quadrant has negative motor torque and positive motor speed, wherein the third quadrant has negative motor torque and negative motor speed, and wherein the fourth quadrant has positive motor torque and negative motor speed;
   b) choosing current turn-on and turn-off rotor-position angles for each motor phase to substantially maximize the absolute value of average motor torque when the motor is operating at a motor speed in an other quadrant different from the one quadrant of step a); and
   c) operating the motor in each of the one quadrant of step a) and the other quadrant of step b); and
   d) limiting absolute value of motor speed if the motor is operating in the first or third quadrant but not if the motor is operating in the second or fourth quadrant.

2. The method of claim 1, wherein the motor is a brushless motor.

3. The method of claim 2, wherein the brushless motor is a switched-reluctance motor.

4. The method of claim 1, also including the steps of using the motor in a system and setting the motor current to the highest level allowed by the system.

5. The method of claim 1, wherein the one quadrant is the first quadrant, and wherein step a) chooses a current turn-on rotor-position angle for each motor phase in a range from a rotor-position angle corresponding to a falling actual inductance equal to one-half peak actual inductance to a rotor-position angle corresponding to minimum actual inductance.

6. The method of claim 5, wherein step a) chooses a current turn-on rotor-position angle for each motor phase such that the current first reaches a maximum when the rotor-position angle corresponds to minimum actual inductance.

7. The method of claim 5, wherein the other quadrant is the second quadrant, wherein step b) chooses a current turn-on rotor-position angle equal to the current turn-off rotor-position angle chosen in step a) minus from zero to substantially eight percent of the machine step, and wherein step b) chooses a current turn-off rotor-position angle equal to the current turn-on rotor-position angle chosen in step a) plus the machine step plus from zero to substantially three percent of the machine step.

8. The method of claim 7, wherein step a) chooses a current turn-on rotor-position angle for each motor phase such that the current first reaches a maximum when the rotor-position angle corresponds to minimum actual inductance.

9. The method of claim 1, wherein the turn-on and turn-off rotor-position angles chosen in steps a) through b) are mathematically expressed as quadratic functions of motor speed.

10. The method of claim 1, also including the step of choosing current turn-on and turn-off rotor-position angles for each motor phase to substantially maximize the absolute value of average motor torque when the motor is operating at a motor speed in an additional quadrant different from the one quadrant of step a) and different from the other quadrant of step b), and wherein step c) includes also operating the motor in the additional quadrant.

11. A method for controlling an electric motor comprising the steps of:
   a) choosing current turn-on and turn-off rotor-position angles for each motor phase to substantially maximize the absolute value of average motor torque when the motor is operating at a motor speed in a first quadrant of positive motor torque and positive motor speed;

b) choosing current turn-on and turn-off rotor-position angles for each motor phase to substantially maximize the absolute value of average motor torque when the motor is operating in a second quadrant of negative motor torque and positive motor speed;

c) choosing current turn-on and turn-off rotor-position angles for each motor phase to substantially maximize the absolute value of average motor torque when the motor is operating in a third quadrant of negative motor torque and negative motor speed;

d) choosing current turn-on and turn-off rotor-position angles for each motor phase to substantially maximize the absolute value of average motor torque when the motor is operating in a fourth quadrant of positive motor torque and negative motor speed; and e) operating the motor in each of the first, second, third, and fourth quadrants; and f) limiting the absolute value of motor speed when the motor is operating in the first or third quadrant but not when the motor is operating in the second or fourth quadrant.

12. The method of claim 11, wherein the motor is a brushless motor.

13. The method of claim 12, wherein the brushless motor is a switched-reluctance motor.

14. The method of claim 11, also including the steps of using the motor in a system and setting the motor current to the highest level allowed by the system.

15. The method of claim 11, step a) chooses a current turn-on rotor-position angle for each motor phase in a range from a rotor-position angle corresponding to a falling actual inductance equal to one-half peak actual inductance to a rotor-position angle corresponding to minimum actual inductance.

16. The method of claim 17, wherein step a) chooses a current turn-on rotor-position angle for each motor phase such that the current first reaches a maximum when the rotor-position angle corresponds to minimum actual inductance.

17. The method of claim 17, wherein step b) chooses a current turn-on rotor-position angle equal to the current turn-off rotor-position angle chosen in step a) minus from zero to substantially eight percent of the machine step, and wherein step b) chooses a current turn-off rotor-position angle equal to the current turn-on rotor-position angle chosen in step a) plus the machine step plus from zero to substantially three percent of the machine step.

18. The method of claim 19, wherein step a) chooses a current turn-on rotor-position angle for each motor phase such that the current first reaches a maximum when the rotor-position angle corresponds to minimum actual inductance.

19. The method of claim 12, wherein the turn-on and turn-off rotor-position angles chosen in steps a) through d) are mathematically expressed as quadratic functions of motor speed.

20. A method for controlling an electric motor comprising the steps of:

a) operating the motor in at least one of a first quadrant having positive motor torque and positive motor speed and a third quadrant having negative motor torque and negative motor speed;

b) operating the motor in at least one of a second quadrant having negative motor torque and positive motor speed and a fourth quadrant having positive motor torque and negative motor speed; and c) limiting the absolute value of motor speed when the motor is operating in the first or third quadrant but not when the motor is operating in the second or fourth quadrant.

21. The method of claim 22, wherein step a) includes operating the motor in the first quadrant and operating the motor in the third quadrant, and wherein step b) includes operating the motor in the second quadrant and operating the motor in the fourth quadrant.

22. The method of claim 22, wherein the motor is operatively connected to a vehicle brake caliper.

23. The method of claim 22, wherein the motor is a brushless motor.

24. The method of claim 25, wherein the brushless motor is a switched-reluctance motor.

25. A method for controlling an electric motor operatively connected to a vehicle brake caliper comprising the steps of:

a) choosing current turn-on and turn-off rotor-position angles for each motor phase to substantially maximize the absolute value of average motor torque when the motor is operating at a motor speed in a first quadrant of positive motor torque and positive motor speed;

b) choosing current turn-on and turn-off rotor-position angles for each motor phase to substantially maximize the absolute value of average motor torque when the motor is operating in a second quadrant of negative motor torque and positive motor speed;

c) choosing current turn-on and turn-off rotor-position angles for each motor phase to substantially maximize the absolute value of average motor torque when the motor is operating in a third quadrant of negative motor torque and negative motor speed;

d) choosing current turn-on and turn-off rotor-position angles for each motor phase to substantially maximize the absolute value of average motor torque when the motor is operating in a fourth quadrant of positive motor torque and negative motor speed;

e) operating the motor in each of the first, second, third, and fourth quadrants; and f) limiting the absolute value of motor speed when the motor is operating in the first or third quadrant but not when the motor is operating in the second or fourth quadrant.

* * * * *